Aug. 13, 1946. T. M. FERRILL, JR 2,405,568
INDICATING APPARATUS
Filed April 29, 1944 2 Sheets-Sheet 1

INVENTOR
THOMAS M. FERRILL, JR.
BY
Herbert H. Thompson
his ATTORNEY

Aug. 13, 1946.    T. M. FERRILL, JR    2,405,568
INDICATING APPARATUS
Filed April 29, 1944    2 Sheets-Sheet 2

INVENTOR
THOMAS M. FERRILL, JR.
BY
his ATTORNEY.

Patented Aug. 13, 1946

2,405,568

UNITED STATES PATENT OFFICE 2,405,568

INDICATING APPARATUS

Thomas M. Ferrill, Jr., Hempstead, N. Y., assignor to Sperry Gyroscope Company, Inc., a corporation of New York Application April 29, 1944, Serial No. 533,434

17 Claims. (Cl. 177—337)

1

This invention relates to synchronous transmission systems, and particularly concerns measurement and compensation of errors occurring in synchronous telemetric data transmission systems.

In synchronous systems of this type a synchronous positional transmitter is usually positioned according to the data desired to be transmitted. A synchronous repeater motor is electrically connected to the transmitter and has a member positionable synchronously with the position of the transmitter to indicate the transmitted data. When the repeater motor is directly connected to the transmitter, certain errors are introduced due to the torque required to overcome friction in the receiver motor and also due to the coercive effect of a reactive torque developed within the transmitter on the instrument from which data is being transmitted.

Since the torque produced by the receiver motor depends upon the magnitude of positional disagreement between the transmitter and the receiver it is sometimes necessary to have appreciable positional disagreement before sufficient torque is developed to overcome friction in the receiver and the indicator operated by the receiver motor. In such a case, the positional disagreement necessary to develop sufficient torque for overcoming the friction of the receiver motor and indicator, results in an error between the transmitted and indicated data.

These errors may be reduced by inserting a power amplifier in the electrical circuit between the transmitter and the receiver for amplifying voltages produced by the transmitter windings and applying the voltages thus amplified to the windings of the receiver motor. The power increase provided in this manner reduces the positional displacement necessary to overcome friction in the receiver motor because less displacement is required to develop the necessary torque. Since the transmitter is isolated from the receiver by the amplifier, there is very little load on the transmitter, hence reactive torque is practically eliminated.

Although the insertion of an amplifier in the transmission system between the transmitter and the receiver motor may reduce errors due to friction in the receiver and reactive torque in the transmitter, any unbalance that may exist or develop in the amplifier circuit will cause other errors between the transmitted and indicated data. It is difficult to design and construct amplifiers which have accurately balanced channels. It is even more difficult to maintain

2 the balance in amplifiers so they will accurately operate the receiver motor synchronously with the transmitter without introducing errors during fluctuations in power supply, temperature changes, etc. As a result, such amplifiers become disproportionately elaborate and expensive except in specific installations where they are used to operate a large number of repeater motors.

An important object of the invention is to provide an improved transmission system including a transmitter and a receiver, wherein discrepancies in the reproduction of transmitted signals are continuously measured.

Another important object of the invention is to provide an improved data transmission system in which received indications are continuously compensated for errors introduced within the system so as to continuously indicate correct information.

Another object of the invention is to provide improved indicating apparatus particularly useful for data transmission system in which errors may be introduced or inherently exist, and wherein the errors are automatically compensated to correctly indicate the transmitted data.

A further object of the invention is to provide a new and improved indicator in which information is continuously indicated by the position of a magnified scale and is continuously corrected by a movable index that is accurately positioned relative to the magnified scale to compensate for errors in the position of the scale.

A still further object of the invention is to provide a simple, efficient, and economical transmission system wherein the accuracy obtained is comparable to that heretofore possible only in expensive and more complicated systems.

Other objects and advantages of the invention, particularly with regard to arrangements of parts for convenience and other special advantages will become apparent in connection with the following description and accompanying drawings illustrating a preferred embodiment of the invention.

Figure 1:
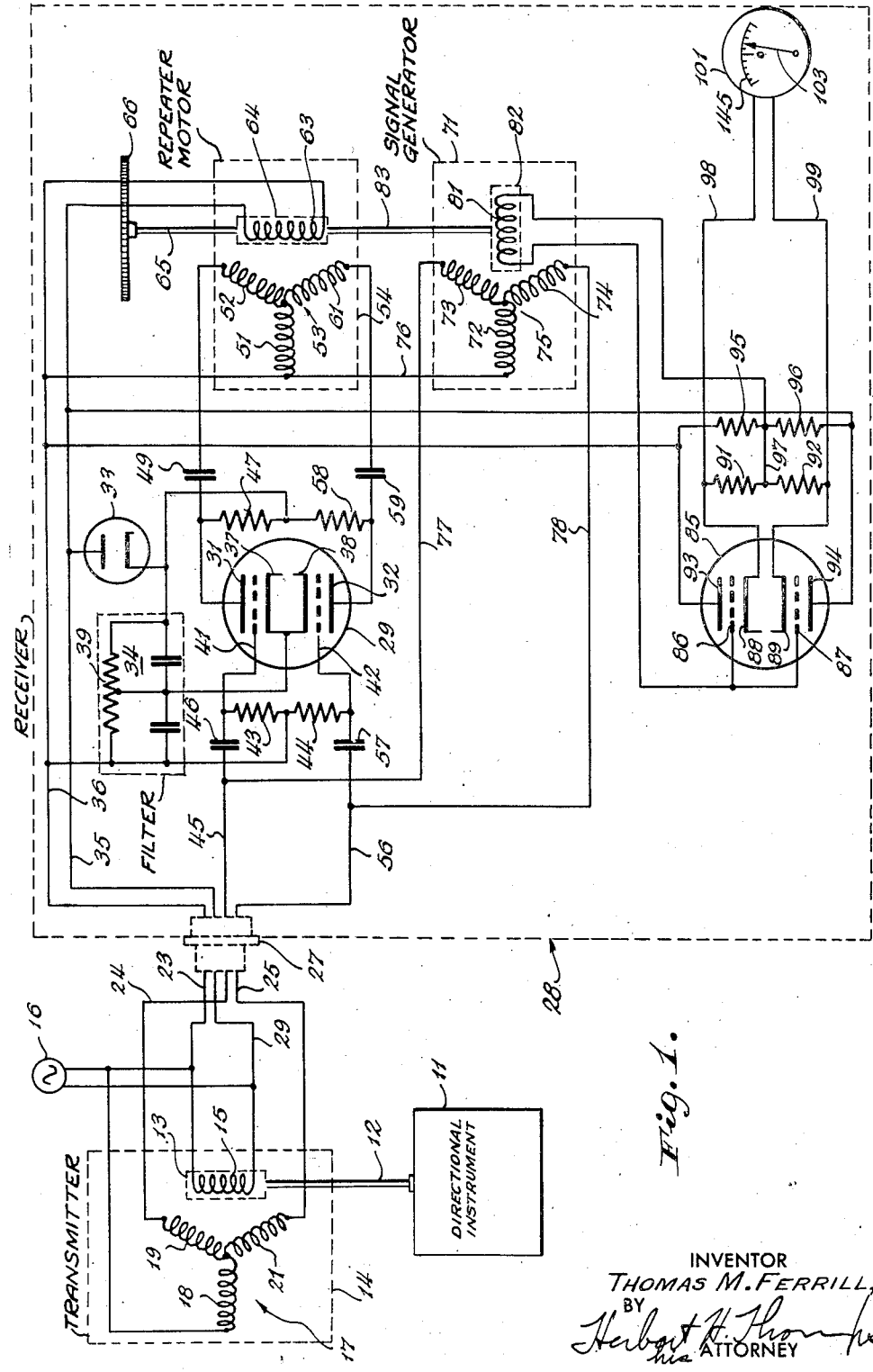
Fig. 1 is a schematic wiring diagram of a data transmission system embodying the invention for measuring errors between transmitted and received data.

For purposes of illustration the invention is incorporated in a data transmission system including a transmitter and receiver which may be of the well-known "Selsyn," "Telegon" or "Autosyn" types having multiple windings interconnected to produce a rotatably positionable field upon excitation of an exciting winding in the transmitter. By connecting a corresponding exciting winding in the receiver to a harmonically related source of energy the receiver motor is operated synchronously with the transmitter in a well-known manner to position the data indicator in accordance with data supplied to the transmitter.

As already explained, friction losses and the coercive effect of the receiver load on the transmitter introduce errors in the indicated data. Preferably these errors are reduced by using the alternative system including an amplifier having separate channels for amplifying voltages of the multiple windings of the transmitter and applying these amplified voltages to corresponding windings of the receiver. As already stated this arrangement is not entirely satisfactory unless expensive, especially stabilized amplifiers are used.

According to the present invention, any errors occurring in the system between the transmitted and received data are measured. To measure the positional disagreement between the transmitter and receiver motor, a signal generator, of the same general construction as the transmitter and the receiver, but which may be constructed on a smaller scale, is mechanically and electrically coupled into the system. This signal generator includes field and pick-up windings arranged for relative rotation. Preferably, relative rotation of these windings is effected by the receiver motor according to the indicated data, and the multiple winding is connected in the transmission system directly to the transmitter.

The field windings and the voltage output winding of the signal generator unit are coupled to the rotor and stator of the receiver motor in such a relation that when the receiver rotor is in exact angular positional agreement with the transmitter rotor, the output of the signal generator unit is zero.

With this arrangement a reversible phase variable magnitude alternating voltage is induced in the pick-up winding of the signal generator in phase relation dependent upon the positional disagreement between the transmitter and receiver. This alternating voltage is converted as by a balanced demodulator into a reversible polarity, variable magnitude unidirectional voltage that is applied to a suitable meter which may have a d'Arsonval type movement. In this manner a pointer on the meter is deflected in one direction or another, dependent upon the polarity of the unidirectional voltage, and is deflected through an angle dependent upon the magnitude of said voltage. The deflection of this pointer thus provides a measure of the direction and magnitude of the positional disagreement between the transmitter and the receiver.

In order to compensate for errors in a data transmission system the pointer may be used as a movable index for the indicated data whereby an appropriate correction will be made automatically. The relative positions of the data indicator and the movable index will provide an accurate indication of the transmitted data, since compensation is made by the positioning of the movable index for errors in the transmission system, as evidenced by positional disagreement between the transmitter and the receiver.

For a more specific description of the preferred embodiment of the invention, attention is first directed to Fig. 1 which shows a data repeater system including apparatus for measuring and providing indications of errors introduced in the data transmitted by the system. A directional instrument indicated schematically by a rectangle 11, such as a compass, is connected as by shaft 12 to position rotor 13 of data transmitter 14 which may be of the "Selsyn," "Telegon" or "Autosyn" type. The rotor 13 carries an exciting winding 15 connected to an appropriate source 16 of alternating voltage. The stator of the data transmitter 14 has a multiple winding 17 shown as including three legs 18, 19 and 21, which are connected as by leads 23, 24 and 25 to a terminal plug 27 of a receiver and indicator 28. Leads 23 and 29 connect the source 16 to the input plug 27 for operating amplifiers forming a part of the receiver indicator 28 as will subsequently appear.

As the position of shaft 12 is adjusted by the directional instrument 11, the flux linkages between rotor winding 15 and the individual legs of multiple winding 17 are varied so voltages induced in the separate legs of the multiple winding 17 are varied in magnitude and phase. A balanced amplifier circuit including double triode 29, amplifies the voltages between the three legs 18, 19 and 21 of the multiple winding 17 and also by amplifying the voltages between lead 23 connected to winding 18 and leads 24 and 25 connected to windings 19 and 21, respectively. In this manner, the difference between the two amplified voltages will be an amplification of the voltage between leads 24 and 25 connected to legs 19 and 21, respectively.

The double triode 29 has its anodes 31 and 32 supplied with suitable unidirectional voltage from the series circuit including rectifier 33 and filter 34 connected across leads 35 and 36, which are in turn connected through the plug 27 to the alternating voltage source 16. Cathodes 37 and 38 of the tube 29 are connected to voltage divider 39 in the filter 34, and grids 41 and 42 of the tube 29 are similarly connected through grid resistors 43 and 44 to voltage divider 39 for applying an appropriate bias to the grids. Since the cathodes are coupled to lead 36 corresponding to lead 23 from the winding 18, and winding 19 is connected by leads 24 and 45 through coupling condenser 46 to the grid 41, the voltage across load resistor 47 in the circuit of plate 31 varies according to an amplification of the voltages between windings 18 and 19.

This amplified voltage corresponding to the voltage between windings 18 and 19 is applied through coupling condenser 49 across corresponding legs 51 and 52 of the multiple winding 53 for receiver or repeater motor 54. Similarly the voltage between windings 18 and 21 is applied between grid 42 and cathode 38 by lead 56 and coupling condenser 57 so a correspondingly amplified voltage appears across load resistor 58 in the circuit of plate 32 and is applied through coupling condenser 59 to winding 61 of the multiple winding 53. Thus, the voltage between windings 51 and 61 corresponds to an amplification of the voltage between windings 18 and 21, and the voltage between windings 52 and 61 correspond to an amplification of the voltage between windings 19 and 21.

As is well known in transmission systems of this type, the relative magnitude and phase relation of the voltage applied to the legs of the repeater multiple winding produce currents in the respective windings which produce a resultant magnetic field in a direction dependant upon the position of transmitter rotor winding 15.

The receiver motor 54 includes an exciting winding 63 carried by rotor 64 having a shaft 65 coupled to a gear 66 which may operate a suitable data indicator. By connecting the exciting winding 63 through leads 35 and 36 to the source 16, a torque is developed between the exciting winding 63 and the resultant field of multiple winding 53 that tends to relatively position the rotor 64 and stator winding 53 synchronously with the relative positions of the rotor and stator in the transmitter 14.

Assuming that no errors are introduced in the transmission system the position of shaft 65 and the data indicated thereby will be the same as that transmitted from a datum member such as the directional instrument 11. However, as previously explained, errors may be introduced due to unbalanced conditions in the amplifier and other causes which result in a positional disagreement between the rotor 13 and the rotor 64 causing an error to appear in the data indicated.

In order to measure this error, a signal generator 71 which may be in the form of a small "Selsyn," "Telegon" or "Autosyn," has individual legs 72, 73 and 74 of multiple winding 75 connected as by leads 76, 77 and 78 to corresponding windings 18, 19 and 21 of the transmitter 14. With this arrangement the relative magnitudes of the voltages induced in the separate windings of the transmitter's multiple winding 17 cause the multiple field winding 75 of the signal generator 71 to produce a resultant field having a direction determined by the relative magnitudes and phases of the currents flowing through the individual windings. Since the direction of this resultant field depends upon the position of rotor 13 it has a predetermined relation to the transmitted data. Pick-up winding 81 on rotor 82 is coupled as by shaft 83 to the rotor 64 of the repeater 54 to be positioned for adjusting the inductive coupling between the pick-up winding 81 and the field winding 75 according to the indicated data. Rotor 82 is so oriented relative to rotor 64 that when rotor 64 is in exact positional agreement with rotor 13, no output voltage is produced across rotor winding 81.

Since the multiple winding 75 of the signal generator 71 produces a resultant field having a direction dependent upon transmitted data and the relative positions of the rotor and stator winding depends upon the indicated or received data, asynchronous characteristics of the transmission system induce a voltage in the pick-up winding 81 having a phase and amplitude corresponding to the direction and magnitude of any positional disagreement between the position of the transmitter rotor 13 and the receiver rotor 64. Therefore this voltage is a measure of any error between transmitted and received data.

This alternating voltage is converted into a reversible polarity variable magnitude unidirectional voltage by a balanced demodulator circuit including a double triode 85 having its grids 86 and 87 directly connected to one side of the pick-up winding 81, and its cathodes 88 and 89 connected through individual cathode resistors 91 and 92 to the opposite side of the pick-up winding 81. With this arrangement the alternating voltage from the pick-up winding is applied in like phase between the grids and cathodes of the opposite sides of the double triode 85. Plates 93 and 94 of the double triode are energized in phase opposition by an alternating voltage from the source 16 by leads 35 and 36, which are connected across resistors 95 and 96. To complete the anode-cathode circuit, the center point of resistor 95 and 96 is connected by a lead 97 to the center point of cathode resistors 91 and 92.

As is well-known, in a balanced demodulator circuit of this type one side or the other of the dual triodes will conduct more anode-cathode current per cycle than the other and a unidirectional voltage will appear across one of the cathode resistors 91 and 92, depending upon the side of the double triode having an anode at positive potential relative to the associated cathode during the most positive excursion of the grids 86 and 87. Thus, a differential unidirectional voltage appears across the series circuit of the cathode resistors 91 and 92 which is of a polarity and a magnitude dependent upon the phase and amplitude of the voltage from pick-up winding 81. This differential unidirectional voltage is applied as by leads 98 and 99 to a suitable voltmeter 101 which may have a conventional d'Arsonval movement. Indicator pointer 103 of the meter 101 is deflected in one direction or another from its neutral position according to the polarity and magnitude of the unidirectional voltage applied thereto. In this manner the direction and magnitude of the deflection of pointer 103 corresponds to the direction and magnitude of the positional disagreement between the transmitter rotor 13 and the receiver rotor 64 to indicate the error between transmitted and received data.

The apparatus thus far described provides a measure and indication of the positional disagreement between the transmitter and receiver corresponding to the error between transmitted and received data. According to an important feature of the invention, received data may be automatically corrected or compensated to eliminate erroneous indications by, for example, using the pointer 103 as a movable reference device for the indicator positioned by gear 66 forming the output of the receiver. Since errors in the neighborhood of five or ten degrees between the positions of the transmitter and repeater rotors may deflect the pointer 103 over a larger scale, for example thirty to forty-five degrees, it is desirable when using the pointer 103 as a movable reference to provide the indicated data on a magnified scale.

Figure 2:
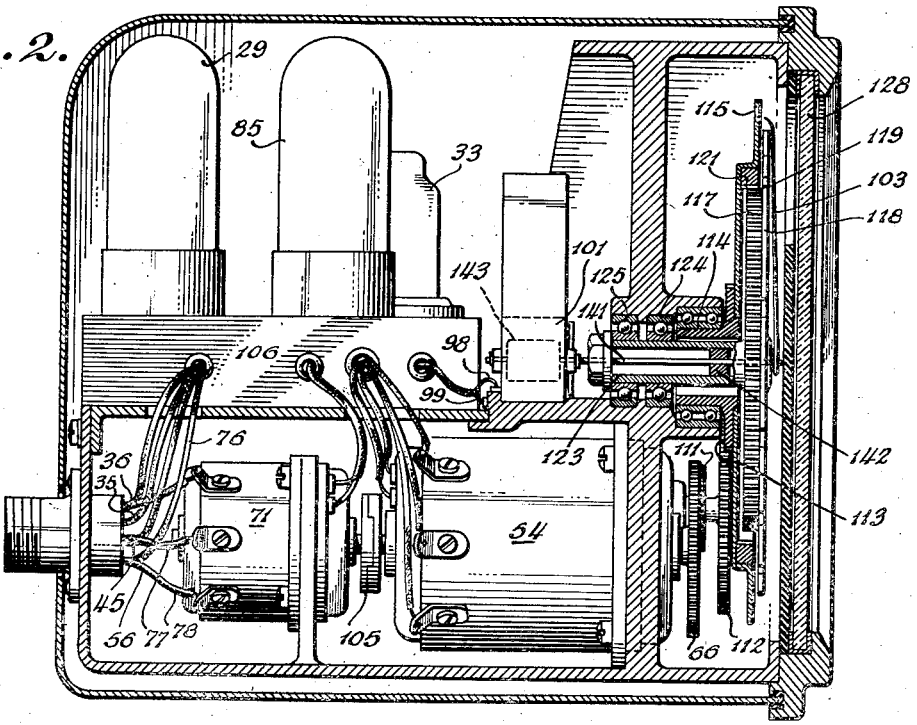
Fig. 2 is a vertical section of an indicator constructed according to the invention for use in a system as shown in Fig. 1, and having an adjustable index for correcting or compensating the indicated data for errors occurring in the transmission system.
Figure 3:
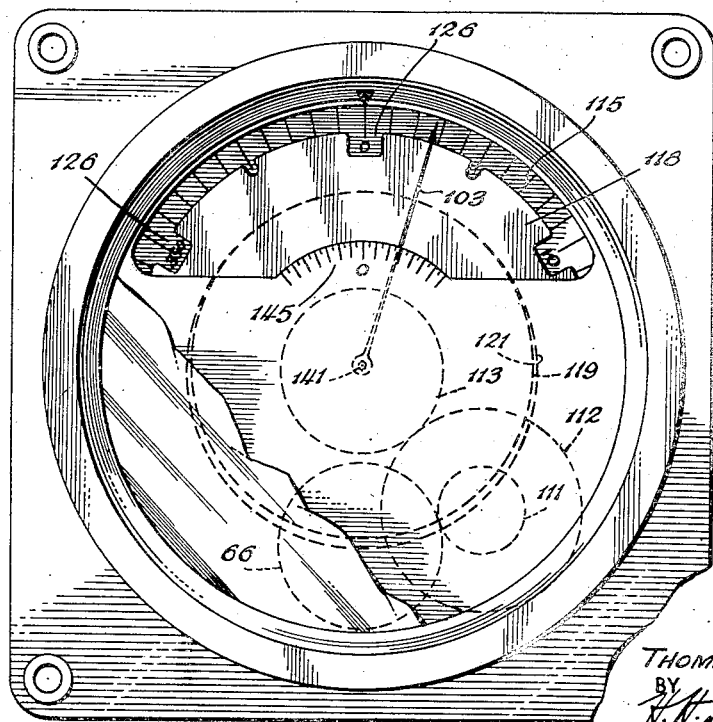
Fig. 3 is a front elevation of the indicator shown in Fig. 2.

For this purpose, the repeater-indicator illustrated in Figs. 2 and 3 may be used. This repeater-indicator includes an angular motion indicator similar to that described in U. S. Patent No. 2,098,580, issued on November 9, 1937, to W. G. Harding. As shown most clearly in Fig. 2, the repeater motor 54 is connected by a coupling 105 to the signal generator 71, the rotor of the repeater motor being also mechanically coupled to the motor of the signal generator 71 as heretofore explained. The amplifier tube 28, together with its rectifier 33 and the demodulator tube 85, are mounted on a suitable chassis 106, inclosing the various circuit elements described in connection with unit 28 of Fig. 1. The output of the demodulator is connected as by leads 98 and 99 to the d'Arsonval movement 101 for positioning needle 103.

The repeater motor 54 operates through the gear 66 which drives through gearing 111 and 112 to rotate a gear 113 supported for rotation in bearing 114 and carrying an indicating card or dial 115. The gearing and the speed of the repeater motor 54 are so proportioned that the dial 115 is caused to move through an angular distance equal to a multiple of the distance through which the compass or other directional instrument 11 apparently turns. In the embodiment shown, the dial 115 turns through five times the angular movement of the master compass. Thus, if the master compass card moves through an angle of 60° the indicating dial 115 of the repeater will move through an angle of 300°. A disc 117 carries a mask card 118 immediately in front of the dial 115. The disc 117 is provided with gear teeth 119, which mesh with teeth 121 forming an internal ring gear attached to the dial 115. The disc 117 is supported on a hollow shaft 123 that is mounted in bearings 124 and 125 arranged eccentrically with respect to the bearing 114 to permit relative movement of the mask 118 and dial 115. It will be understood that with this arrangement rotation of dial 115 will cause a proportional rotation of mask 118 at a slightly higher speed and in the same direction, due to their geared relationship since the inner gear formed by teeth 119 has less teeth than the ring gear on the dial 115. The edge of the indicating dial 115 is, as shown in Fig. 3, divided by markings, into equal divisions numbered in a special manner. The mask 118 is formed with notches or apertures 126, 126, cut in its edge, of such size as, when the mask 118 is placed above dial 115, to enable certain figures on the card to be seen, as clearly shown in Fig. 3. As the card and mask rotate at different rates the apertures will pass slowly from one figure to another, but owing to the eccentric mounting of the card and mask the numbers on the cards and the spaces on the mask will travel substantially together for an arc of about one-third of a circle, at the top of the repeater as shown in Fig. 3. Over the remaining two-thirds of the circle the numbers will be displaced more or less from the gaps in the mask, and to avoid confusion the lower portion of the card and mask are screened as shown in the drawings. The repeater-indicator is provided with the usual glass cover-plate 128 (Fig. 2).

As more fully described in the aforementioned patent, the dial 115 revolves at five times the rate of the shaft from repeater motor 54, which, of course, is synchronous with the transmitter shaft 12. Therefore, the scale of the indicated data as represented by the indications on the dial 115 is greatly magnified to enable more accurate observations of small changes in received data.

In order to correct these magnified indications for errors between the transmitted and received data, the pointer 103 is supported on a shaft 141 supported within the hollow shaft 123 as by a fiber bushing 142 to be positioned by rotating element 143 of the d'Arsonval movement 101. The movement of the pointer 103 is calibrated by adjusting the gain of the demodulator tube 95 to deflect the pointer according to the maskings on the dial 115 for corresponding errors in the positional disagreement of the transmitter and receiver. For example, a positional disagreement of two degrees between the transmitter and repeater rotors would deflect the pointer 103 through an angle of ten degrees subtended by two indications on the dial 115. In this manner, the pointer 103 operates as an adjustable reference device for the indicator dial 115, so the relative positions of the dial and the reference pointer at all times provide an accurate indication of the transmitted data. The actual error between transmitted and received data is indicated by the position of the pointer 103 relative to a scale 145 on the stationary portion of the face of the instrument.

By virtue of this arrangement, the dial is continuously positioned by the repeater motor 54 to provide a magnified indication of received data. Errors between transmitted and received data are measured by the output of the signal generator 71 and indicated by the position of pointer 103. Since the pointer 103 represents a movable index for the dial 115, any error in the received data is corrected by the position of the pointer, so the relative positions of the pointer 103 and the dial 115 at all times represent transmitted data from the directional instrument 11.

What is claimed is:

1. A control system comprising in combination, a transmitter coupled with a control member, a synchronous repeater motor coupled with a controlled member, said transmitter and motor having multiple windings interconnected to form a synchronous transmission system for synchronously positioning said members, and signal generator means mechanically driven by said repeater motor and electrically connected to said transmission system and responsive to asynchronous characteristics thereof for developing a signal dependent upon positional disagreement of said members.

2. A control system comprising in combination, a transmitter coupled with a control member, a synchronous repeater motor coupled with a controlled member, said transmitter and motor having multiple windings interconnected to form a synchronous transmission system for synchronously positioning said members, and a signal generator including a field winding and a pick-up winding having their inductive coupling adjustably arranged with movement of one of said members, said field winding being connected in circuit with said multiple windings for inducing a signal in said pick-up winding corresponding to positional disagreement of said members.

3. A control system comprising in combination, a transmitter coupled with a control member, a synchronous repeater motor coupled with a controlled member, said transmitter and motor each having multiple windings interconnected to form a synchronous transmission system for synchronously positioning said members, a signal generator including a field winding and a pick-up winding having their inductive coupling adjustable by movement of said controlled member, said field winding being connected in circuit with said multiple windings for inducing a voltage in said pick-up winding corresponding to the positional disagreement between said members, and an error indicator connected to said pick-up winding to be deflected by the voltage induced therein according to said positional disagreement.

4. A data transmission system comprising a positionable datum member, a transmitter coupled with said datum member, a synchronous repeater motor, an indicator member positioned by said motor, said transmitter and repeater motor being connected in a synchronous system for positioning said indicator member synchronously with said datum member, a movable reference device for said indicator member, and means responsive to asynchronous characteristics of said synchronous system for positioning said reference device relative to said indicator according to positional disagreement between said members for providing continuously accurate data indications.

5. A data transmission system comprising a positional datum member, a transmitter coupled with said datum member, a synchronous repeater motor, an indicator member positioned by said repeater motor, said transmitter and said repeater motor being connected in a synchronous system for positioning said indicating member synchronously with said datum member, a movable reference device for said indicator member, a signal generator including a field winding and a pick-up winding having their inductive coupling adjustable by rotation of said indicator member, said field winding being connected in circuit with said synchronous system to induce a voltage in said pick-up winding corresponding to positional disagreement between said members, and means connected to said pick-up winding for operating said reference device according to said disagreement to provide continuously accurate data indications.

6. A data transmission system comprising a positionable datum member, a transmitter coupled with said datum member, a synchronous repeater motor coupled with an indicator dial having indications thereon, said transmitter and motor being connected in a synchronous system for positioning said indicator dial synchronously with said datum member, a mask adjacent said dial, means for differentially revolving said dial and said mask to expose said indications in their correct sequence, a movable reference device positionable over a segmental portion of said dial to correct the data indicated thereby, and means responsive to asynchronous characteristics of said synchronous system for positioning said reference device according to the positional disagreement between said datum member and said dial for continuously providing accurate data indications.

7. A data transmission system comprising a positionable datum member, a transmitter coupled with said datum member, a synchronous repeater motor coupled with an indicator, said transmitter and repeater motor being connected in a synchronous system including an amplifier for supplying signals from said transmitter to said motor for positioning said indicator member synchronously with said datum member, a movable reference device for said indicator member, a signal generator including a field winding and a pick-up winding having their inductive coupling adjustable by rotation of said indicator member, said field winding being connected to said transmitter in a manner to induce a voltage in said pick-up winding corresponding to positional disagreement between said members, and means connected to said pick-up winding for positioning said movable reference device according to said positional disagreement to continuously provide accurate data indications.

8. In a synchronous transmission system, apparatus for indicating transmitted positional data comprising a synchronous repeater motor, a movable positional data indicator positioned by said motor, electrical coupling means for operating said motor by positional data signals from a transmitter to position said indicator substantially in agreement with said signals, a movable reference device for said indicator member, and means coupled to said motor and connected in circuit with said electrical coupling means responsive to the difference between the positional data represented by said signals and the position of said motor for positioning said reference device relative to said indicator according to errors in said indicated data to continuously provide accurate data indications.

9. In a synchronous transmission system, apparatus for indicating transmitted positional data comprising a synchronous repeater motor, a movable positional data indicator positioned by said motor, electrical coupling means for operating said motor by positional data signals from a transmitter to position said indicator substantially in agreement with said signals, and a signal generator including a field winding and a pick-up winding having their inductive coupling adjustable by rotation of said motor, said field winding being connected to said electrical coupling means for inducing signals in said pick-up winding corresponding to the difference between the positional data represented by said signals and the position of said motor.

10. In a synchronous transmission system, apparatus for indicating transmitted positional data comprising a synchronous repeater motor, a movable positional data indicator positioned by said motor, electrical coupling means for operating said motor by positional data signals from a transmitter to position said indicator substantially in agreement with said signals, an error indicator, a signal generator including field winding and a pick-up winding having their inductive coupling adjustable by rotation of said motor, said field winding being connected to said electrical coupling means for inducing a voltage in said pick-up winding corresponding to the difference between the positional data represented by said signals and the position of said motor, and means connected to said pick-up winding for operating said error indicator according to said difference.

11. In a synchronous transmission system, apparatus for indicating transmitted positional data comprising a synchronous repeater motor, a movable positional data indicator positioned by said motor, electrical coupling means for operating said motor by positional data signals from a transmitter to position said indicator substantially in agreement with said signals, a movable reference device for said indicator member, a signal generator including a field winding and a pick-up winding having their inductive coupling adjustable by rotation of said motor, said field winding being connected to said electrical coupling means for inducing signals in said pick-up winding corresponding to the difference between the positional data represented by said signals and the position of said motor, and means connected to said pick-up winding for positioning said reference device relative to said indicator member according to said difference to continuously provide accurate data indications.

12. In a synchronous transmission system, apparatus for indicating transmitted positional data comprising a synchronous repeater motor, a movable positional data indicator positioned by said motor, electrical coupling means including an amplifier for amplifying positional data signals from a transmitter to operate said motor to position said indicator according to said signals, and means mechanically coupled to said motor and electrically connected in circuit with said electrical coupling means for producing signals corresponding to error in the positioning of said indicator relative to said signals.

13. In a synchronous transmission system, apparatus for indicating transmitted positional data comprising a synchronous repeater motor, a movable positional data indicator positioned by said motor, electrical coupling means including an amplifier for amplifying positional data signals from a transmitter to operate said motor to position said indicator substantially in agreement with said signals, and a signal generator including a field winding and a pick-up winding having their inductive coupling adjustable by rotation of said motor, said field winding being connected in circuit with said electrical coupling means for inducing signals in said pick-up winding corresponding to the difference between positional data represented by said signals and the position of said motor.

14. In a synchronous transmission system, apparatus for indicating transmitted positional data comprising a synchronous repeater motor, a movable positional data indicator positioned by said motor, electrical coupling means including an amplifier for amplifying positional data signals from a transmitter to operate said motor to position said indicator substantially in agreement with the amplified positional data signals, a movable reference device for said indicator member, a signal generator including a field winding and a pick-up winding having their inductive coupling adjustable by rotation of said motor, said field winding being connected in circuit with said electrical coupling means for inducing signals in said pick-up winding corresponding to the difference between the positional data represented by said signals and the position of said motor, and means actuated by said pick-up winding for positioning said reference device relative to said indicator member according to said difference to continuously provide accurate data indications.

15. In a synchronous data transmission system, apparatus for indicating transmitted positional data comprising a synchronous repeater motor, an indicator dial having indications thereon, a mask adjacent said dial having apertures therein, means operative by said motor for differentially revolving both said dial and said mask to expose said indications in a correct sequence, electrical coupling means for operating said motor by positional data signals from a transmitter to position said dial and said mask substantially in agreement with said signals, a reference device adjustably positionable over a segmental portion of said dial, and means coupled to said motor and connected in circuit with said electrical coupling means responsive to the difference between the positional data represented by said signals and the position of said motor for deflecting said reference device relative to said dial according to said difference to continuously provide accurate data indications.

16. In a synchronous data transmission system, apparatus for indicating transmitted positional data comprising a synchronous repeater motor, an indicator dial having indications thereon, a mask adjacent said dial having apertures therein, means operative by said motor for differentially revolving both said dial and said mask to expose said indications in a correct sequence, electrical coupling means for operating said motor by positional data signals from a transmitter to position said dial and said mask substantially in agreement with said signals, reference device adjustably positionable over a segmental portion of said dial, a signal generator including a field winding and a pick-up winding having their inductive coupling adjustable by rotation of said motor, said field winding being connected in circuit with said electrical coupling means for inducing signals in said pick-up winding corresponding to the difference between the positional data represented by said signals and the position of said motor, and means actuated by said pick-up winding for positioning said reference device relative to said dial according to said difference to continuously provide accurate data indications.

17. Apparatus for synchronously indicating positional data from a synchronous electrical positional transmitter, comprising a synchronous positional repeater motor having a movable positional indicator, means for electrically coupling said motor to said transmitter to provide movement of said indicator substantially in agreement with signals produced by movement of said transmitter, signal generator means mechanically driven by said repeater motor and electrically connected to said electrical coupling means for producing a signal responsive to positional disagreement of said repeater and said transmitter, and means responsive to said signal for indicating said positional disagreement.

THOMAS M. FERRILL, Jr.